United States Patent
Blomkvist (10) Patent No.: US 8,077,702 B2
(45) Date of Patent: Dec. 13, 2011

(54) CALLER INFORMATION PROVISION

(75) Inventor: Magnus Blomkvist, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1144 days.

(21) Appl. No.: 11/817,123

(22) PCT Filed: Feb. 20, 2006

(86) PCT No.: PCT/EP2006/001499
§ 371 (c)(1),
(2), (4) Date: Aug. 24, 2007

(87) PCT Pub. No.: WO2006/089698
PCT Pub. Date: Aug. 31, 2006

(65) Prior Publication Data
US 2008/0260126 A1    Oct. 23, 2008

Related U.S. Application Data

(60) Provisional application No. 60/659,462, filed on Mar. 8, 2005.

(30) Foreign Application Priority Data

Feb. 25, 2005    (EP) .................................... 05004174

(51) Int. Cl.
H04L 12/66 (2006.01)
H04M 1/00 (2006.01)
H04M 15/00 (2006.01)

(52) U.S. Cl. ............... 370/352; 455/415; 455/550.1; 455/552.1; 379/142.01; 379/142.17

(58) Field of Classification Search ............... 379/88.11, 379/88.12, 88.19, 88.2, 93.17, 93.23, 142.01, 379/142.04, 142.16, 142.17, 245, 247; 455/415, 455/550.1, 552.1, 553.1; 370/352, 357
See application file for complete search history.

(56) References Cited

U.S. PATENT DOCUMENTS

| 6,243,443 | B1 * | 6/2001 | Low et al. ................. 379/88.17 |
| 6,282,281 | B1 * | 8/2001 | Low ............................ 379/230 |
| 6,798,771 | B1 * | 9/2004 | Low et al. ..................... 370/353 |

(Continued)

FOREIGN PATENT DOCUMENTS

EP    1 296 499 A2    3/2003
(Continued)

OTHER PUBLICATIONS

International Search Report for PCT/EP2006/001499 dated Apr. 25, 2006, 3 pages.

(Continued)

*Primary Examiner* — Binh Tieu
(74) *Attorney, Agent, or Firm* — Harrity & Harrity, LLP (57) ABSTRACT

By the present invention are disclosed a method for providing and a method for obtaining voice call related information from a first party device (100) to a second party device (200), prior to establishing a voice call between the first party device (100) and the second party device (200). Portable communication devices (100, 200, 500) for providing and obtaining of voice call related information also disclosed. The methods comprises sending/obtaining in real time the voice call related information (steps 304, 402) from the first party device (100) to the second party device (200) over a packet switched network, and sending/obtaining a call setup message (steps 308, 410) over a circuit switched network, of the voice call from the first party device (100), so that the voice call related information can be presented to a user of the second party device (200) before responding to the call setup message.

19 Claims, 3 Drawing Sheets

U.S. PATENT DOCUMENTS

| | | | |
|---|---|---|---|
| 6,798,872 B1 * | 9/2004 | Matsumoto et al. | 379/142.01 |
| 7,092,370 B2 * | 8/2006 | Jiang et al. | 370/329 |
| 7,154,999 B2 * | 12/2006 | Florkey et al. | 379/142.01 |
| 7,177,627 B2 * | 2/2007 | Melaku et al. | 455/414.1 |
| 2003/0032414 A1 | 2/2003 | Melaku et al. | |
| 2004/0032946 A1 * | 2/2004 | Koser et al. | 379/373.01 |
| 2004/0223605 A1 * | 11/2004 | Donnelly | 379/373.01 |
| 2007/0208798 A1 * | 9/2007 | Kagawa et al. | 709/201 |
| 2007/0237320 A1 * | 10/2007 | Bloebaum et al. | 379/142.15 |
| 2008/0063166 A1 * | 3/2008 | An et al. | 379/142.04 |

FOREIGN PATENT DOCUMENTS

| | | |
|---|---|---|
| EP | 1 398 943 A1 | 3/2004 |
| WO | WO 02/17602 A2 | 2/2002 |

OTHER PUBLICATIONS

International Preliminary Report on Patentability for PCT/EP2006/001499 dated Apr. 18, 2006, 14 pages.

* cited by examiner

CALLER INFORMATION PROVISION

RELATED APPLICATIONS

This application is a national phase application under 35 U.S.C. §371 of PCT International Application No. PCT/EP2006/001499, which has an International filing date of Feb. 20, 2006, which designated the United States of America and claims priority to European Patent Application No. 05004174.8, filed Feb. 25, 2005, and U.S. Provisional Application Ser. No. 60/659,462 filed Mar. 8, 2005, which are all incorporated by reference herein.

The present invention relates to providing caller information services for voice call telecommunication connections.

DESCRIPTION OF RELATED ART

One step of development of 2G and 3G communications networks is the introduction of the Internet Protocol Multimedia Subsystems (IMS). IMS is one component of significant importance in the long term vision of an All-IP network which would be able to carry all signaling communication as well as traffic communication, including voice communication, over packet switched (PS) networks.

IMS introduces a method for signaling over an IP network for call control and session initiation using the session initiation protocol (SIP). The use of SIP signaling to initiate a session such as a phone call, an Instant messaging session, etc. will make it possible for the caller to send detailed information, for instance about himself, his full name and the purpose of the call or session, for instance "Travel booking", during setup. As this information is sent during setup, it can easily made available to the called party by presenting the information to said party, before said party is asked to decide whether to accept the incoming request or not.

From the called party's view it is advantage to get access to information about an incoming voice call request before having to decide whether to accept the call or not.

From a calling party's view it increases the possibility to reach the called party by presenting the information that may be of interest to the called party, which information may cause the called party to interrupt the on-going business and take the call.

Also by being provided information on the incoming voice call request, the called party can decrease the number of times of accepting an incoming call being less important than the on-going activity.

There is however a major obstacle to this message presentation possibility and that is that IMS is not yet fully supported, which means that the communication of the information as indicated above is not possible and will not be possible in the near future.

The state of the art service, Calling line identity presentation (CLIP) however, enables the called party to view the calling party's telephone number before deciding whether to accept the incoming request or not.

A user of a phone may also associate a phone number with the full name or a picture of the person owning the telephone. This association may subsequently be used by the called party, when being called by the calling party, in a way such that the full name or the picture of the calling party is presented to the called party during the call setup. This information is thus provided by the called party and is therefore not provided automatically from the network. This solution has to be specified in beforehand and is also static since it does not provide data to be dynamic or to be updated on receipt of a call.

Moreover, for voice calls a delay of less than typically 150 ms is required to obtain a user satisfaction without echoing and perceived delays in the voice communication. Packet switched bearers with such low latency set high demands on the network and are for this reason still not widely spread as for today.

Such PS bearers are however expected in true 3G networks.

There is thus a need to overcome the deficiences as mentioned above and to provide a solution for voice calls with a high user satisfaction.

WO0217602 discloses a mobile telephone which can supply or post 'pre-answer' information which the device owner considers of relevance to a potential call recipient. This information enables a potential call recipient to be given useful information about a potential call before actually answering that call. The pre-answer information may be sent as data prior to a voice channel being opened, for example as SMS data, a Smart Message or packet data.

EP1398943 discloses presenting to a called party advanced presentations (or representations) of the calling party, to be presented to the called party before answering (or refusing) a call. Signal elements may relate to an audible calling (notification) signal e.g. to be output by the called second terminal under control of said signal elements. Such audible calling signal may comprise e.g. a ringtone signal, a ("spoken") message or a music or sound clip. The signal elements also may relate to a visible calling signal (notification message) to be displayed by the relevant second terminal under control of said signal elements. Such visible calling signal may e.g. comprise a caller specific picture or video clip.

US2004223605 discloses a computerized system and method for selecting the nature and/or form of an alert used to announce a call made by a user participating in a customized alter service. The method includes establishing a customized alert service configuration for a participating user, which configuration is then stored on one or more network accessible devices. The participating user uses a first communications terminal to make a call to a second communications terminal, via a first communications service, the second communication terminal then announces the call by activating an alert using a chosen alert descriptor which has been chosen according to the customized alert service configuration for the participating user.

SUMMARY OF THE INVENTION

The invention is directed towards solving the problem of providing a called party with information related to a voice call from a calling party, before responding to the voice call between the calling party and the called party.

This is achieved by separately providing and obtaining, respectively, in real time information related to the voice call from the calling party device to the called party device.

A first object of the present invention is to provide a method for providing in real time information related to the voice call from the calling party to the called party.

According to one aspect of this invention, this object is achieved by a method for providing voice call related information from a first party device to a second party device, prior to establishing a voice call between the first party device and the second party device, comprising the steps of sending in real time the voice call related information by the first party device to the second party device over a packet switched network, and sending a call setup message over a circuit switched network, of the voice call by the first party device, so that the voice call related information can be presented to a user of the second party device before responding to the call setup message.

A second aspect of the present invention is directed towards a method including the features of the first aspect, further comprising the step of receiving by the first party device over the packet switched network an acknowledgement from the second party device of receipt of the voice call related information, and wherein the step of sending a call setup is performed in dependence of receiving the acknowledgement.

A third aspect of the present invention is directed towards a method including the features of the first aspect, wherein the voice call related information and the call setup message comprise an identifier of the user of the first party device.

A fourth aspect of the present invention is directed towards a method including the features of the third aspect, wherein the voice call related information comprises an information type indicator.

A fifth aspect of the present invention is directed towards a method including the features of the first aspect, wherein the voice call related information further comprises data related to the user of the first party device.

A second object of the present invention is to provide a method for obtaining in real time information related to the voice call from the calling party to the called party.

According to a sixth aspect of present invention, this object is achieved by a method for obtaining voice call related information by a second party device from a first party device, prior to responding to a call setup message from the first party device, comprising the steps of receiving in real time the voice call related information by the second party device over a packet switched network, receiving the call setup message by the second party device from the first party device over a circuit switched network, and responding by the second party device to the first party device over the circuit switched network to the call setup message, in dependence of the voice call related information received over the packet switched network.

A seventh aspect of the present invention is directed towards a method including the features of the sixth aspect, further comprising the step of sending an acknowledgement by the second party device of receipt of the voice call related information, to the first party device over the packet switched network.

An eighth aspect of the present invention is directed towards a method including the features of the sixth aspect, wherein the voice call related information and the call setup message comprise an identifier of the user of the first party device.

A ninth aspect of the present invention is directed towards a method including the features of the eighth aspect, wherein the voice call related information comprises an information type indicator, which information type indicator indicates that the voice call related information is to be used to present information upon receiving the call setup by the second party device.

A tenth aspect of the present invention is directed towards a method including the features of the eighth aspect, wherein the voice call related information further comprises data related to the user of the first party device.

An eleventh aspect of the present invention is directed towards a method including the features of the eighth aspect, further comprising the step of associating the received call setup with the received voice call related information, by matching the first party device user identifier comprised in the voice call related information and the first party device user identifier comprised in the call setup, so that the voice call related information can be presented to the user of the second party device before responding to the call setup message.

A twelfth aspect of the present invention is directed towards a method including the features of the eleventh aspect, wherein the step of associating further comprises presenting the voice call related information by the second party device.

A third object of the present invention is to provide a device for providing in real time information related to the voice call from the calling party to the called party.

According to a thirteenth aspect of present invention, this object is achieved by a portable communication device for providing voice call related information over a packet switched network to a communication device for receiving voice call related information, comprising a transceiving unit, arranged to send the voice call related information in real time over a packet switched network to the communication device and to send a call setup message over a circuit switched network to the communication device, a user input unit, arranged to receive user input from a user of the portable communication device, and a control unit, connected to the user input unit and the transceiving unit, arranged to control sending in real time the voice call related information over the packet switched network and to control sending the call setup message over the circuit switched network, so that voice call related information can be presented to a user of the communication device for receiving the voice call related information.

A fourteenth aspect of the present invention is directed towards a portable communication device including the features of the thirteenth aspect, in which the transceiving unit further is arranged to receive an acknowledgement of receipt of received voice call related information over a packet switched network, and in which the control unit further is arranged to detect receiving the acknowledgement over the packet switched network.

A fourth object of the present invention is to provide a device for obtaining in real time information related to the voice call from the calling party to the called party.

According to a fifteenth aspect of present invention, this object is achieved by a portable communication device for obtaining voice call related information over a packet switched network from a communication device for providing voice call related information, comprising a transceiving unit, arranged to receive the voice call related information in real time over the packet switched network from the communication device, to receive a call setup message from the communication device over a circuit switched network, and to respond to the communication device over the circuit switched network to the call setup message, a user input unit, arranged to receive user input from a user of the portable communication device, and a control unit, connected to the user input unit and the transceiving unit, arranged to control receiving in real time the voice call related information from the communication device over the packet switched network, to control receiving the call setup message from the communication device over the circuit switched network, and to control responding to the call setup message to the communication device over the circuit switched network, so that voice call related information can be presented to the user of the portable communication device.

A sixteenth aspect of the present invention is directed towards a communication device including the features of the fifteenth aspect, in which the transceiving unit further is arranged to send an acknowledgement of receipt of the voice call related information to the communication device over the packet switched network, and in which the control unit further is arranged to control sending the acknowledgement of receipt of the voice call related information to the communication device over the packet switched network.

A seventeenth aspect of the present invention is directed towards a communication device including the features of the fifteenth aspect, further comprising a memory unit, connected to the control unit, and arranged to provide storage of and access to voice call related information, and wherein the control unit further is arranged to read an information type indicator comprised in the voice call related information and arranged to store the voice call related information in the memory unit, in dependence of the information type indicator.

An eighteenth aspect of the present invention is directed towards a communication device including the features of the sixteenth aspect, further comprising an associating unit, connected to the control unit and the memory unit, arranged to associate the received call setup with the received voice call related information, by matching an identifier of the user of the communication device in the voice call related information and an identifier of the user of the communication device in the call setup, so that the voice call related information can be presented to the user of the portable communication device before responding to the call setup message.

A nineteenth aspect of the present invention is directed towards a communication device including the features of the thirteenth or the fifteenth aspect.

Within the description as found below, the expression "calling party" is synonymous with the "user of the portable communication device for providing voice call related information", in the same way as the "called party" is synonymous with the "user of the portable communication device for obtaining voice call related information".

The present invention has the following overall advantages:

The present invention provides the possibility to a calling party to take advantage of the capabilities to present information about the calling party and the voice call. It also provides the advantage of using a circuit switched network for the call setup, thereby avoiding uneven delaying and echoing which would ruin any user experience.

For the calling party the present invention increases the possibility to reach through to the called party by presenting the information that can be of interest to the called party, which information may cause the called party to interrupt the on-going business and take the call. The invention as presented herein, is beneficial for the called party in that it provides the advantage of giving a help in sorting out which voice calls may be worthwhile to take, thereby decreasing the number of interruptions of any on-going work.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF THE EMBODIMENTS

The present invention relates to providing voice call related information from the calling party to the called party in real time.

The present invention thus provides a user of for instance a mobile phone, being one example of a portable communication device, that is the called party, an opportunity to gain information in real time about an in-coming circuit switched voice call from the calling party, before answering the voice call.

Before answering an in-coming circuit switched voice call, information on the content of the voice call, the name and identity of the calling party, the importance of the voice call, the priority of the voice call etc., at least according to the calling party, may be presented to the called party. This information may then be consumed by the called party before deciding whether to accept or reject the in-coming circuit switched voice call.

For example, in case a calling party is not successful in reaching a called party with a voice call, the calling party may utilize the present invention. The calling party may then furnish the portable communication device being used, such as a mobile phone, with data that is pertinent to the voice call that he is eager to establish with the called party. The calling party may at this stage insert his full name, the priority of the voice call, the subject of the voice call, for instance "Urgent discussion about Asian orders", or "CEO is waiting", to mention two examples only.

As the calling party has not been successful in establishing a voice call with the called party, due to the called party rejected the in-coming call request or simply not answering to the voice call, the calling party is now sending an information message to the calling party. The information contained in this message is presented to the called party at the time when the called party receives an incoming voice call request. Since the message may contain useful and interesting information to the called party, the called party is more likely to accept the circuit switched voice call request, thereby establishing the voice call which the calling party was eager to establish with the called party.

Figure 1:
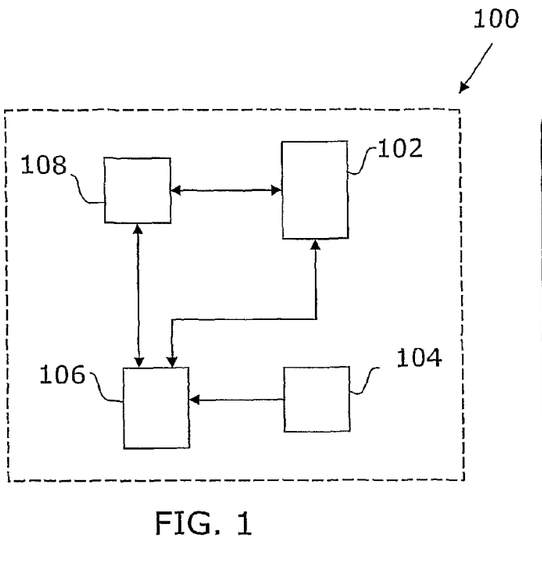
FIG. 1 schematically shows a portable communication device for providing voice call related information, according to one embodiment of the present invention, FIG. 2 schematically shows a portable communication device for obtaining voice call related information, according to one embodiment of the present invention, according to the present invention.
Figure 2:
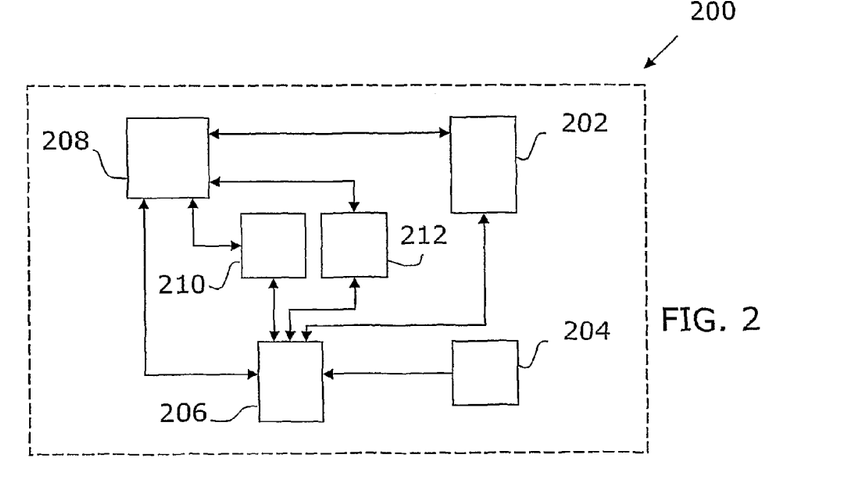

With reference to the FIGS. 1 and 2, schematically showing a portable communication device for providing and obtaining, respectively, voice call related information, according to the present invention, said present invention is now explained.

According to one embodiment of the present invention, the portable communication device 100 for providing information to the called party comprises a transceiving unit 102 that is arranged to send voice call related information in real time to the called party over a packet switched network, a user input unit 104, that is arranged to receive user input from a user of said portable communication device 100, that is the calling party, and a memory unit 108 that is arranged to be able to store and to contain various voice call related information messages or drafts thereof. These messages typically comprise descriptors such as "Name of the calling party", "Subject of voice call", "Priority of voice call" and a "Ring tone" selected by the calling party, to be used when alerting the called party, upon receipt of a setup message, as will be explained in more detail down below.

The portable communication device according to this embodiment also comprises a control unit 106 that is connected to the transceiving unit 102, the user input unit 104, the memory unit 108 in turn is connected to the transceiving unit 102, according to this embodiment, and which control unit 106 is arranged to control the functions of the other units comprised in the portable communication device 100, that is, to control the sending in real time of the voice call related information over the packet switched network to the called party, control the storing and recalling of the various voice call related messages and drafts thereof, and the control the receiving of user inputs from the user input unit 104. Moreover, the transceiving unit 102 is also arranged to send a call setup message over a circuit switched network to a communication device of the called party. This setup message is sent from the portable communication device 100 of the calling party to the device of the called party in order to set up the circuit switched voice call between the calling party and the called party. Consequently, the control unit 106 is also arranged to control sending the call setup message over the circuit switched network.

With reference to FIG. 2 schematically presenting a portable communication device 200 for obtaining voice call related information over a packet switched network from a communication device, according to one embodiment of the present invention, the method for obtaining the voice call related information is now explained.

Similar to the portable communication device 100 as presented in FIG. 1, this portable communication device 200 as presented in FIG. 2, for obtaining voice call related information over a packet switched network, comprises a transceiving unit 202, a user input unit 204, a control unit 206 and a memory unit 208. Again, the control unit 206 is connected to the transceiving unit 202, the user input unit 204 and the memory unit 208. The transceiving unit 202 is here arranged to receive voice call related information in real time over the packet switched network and to receive the setup message from a communication device of the calling party, over a circuit switched network and to respond to the call setup message to the communication device over the circuit switched network. The user input unit 204 is now arranged to receive user input from user of the portable communication device 200, that is the called party. The memory unit 208 is arranged to provide storing of received voice call related information messages and to provide access to the stored voice call related information messages upon receiving a circuit switched voice call setup message by the transceiving unit 202. The control unit 206 of the portable communication device 200 is arranged to control the receiving in real time of the voice call related information from the communication device over the packet switched network, to control the receiving of the setup message from a communication device of the calling party over a circuit switched network, to control responding to the communication device to the call setup message over the circuit switched network and also to control responding to the call setup message to the communication over a circuit switched network, as will be explained down below.

The portable communication device according to this embodiment also comprises an information presenting unit 212 and an associating unit 210. The associating unit 210 is connected to both the control unit 206 and the memory unit 208 and is arranged to associate a stored voice call related information with a circuit switched voice call setup as sent by the calling party device and received by the called party device. The information presenting unit 212 is arranged to present the voice call related information to the user of the portable communication device upon receipt of a circuit switched voice call setup from the communication device of the calling party.

In order to further describe the present invention, the method for providing voice call related information, according to one embodiment of the present invention, will now be explained, and in connection reference will be given to FIG. 3.

According to one embodiment of the present invention the method for providing voice call related information comprises, the step of obtaining a caller record, being one type of voice call related information, step 302. Within this step the portable communication device of the calling party obtains voice call related information by receiving user input via the user input unit 104, by reading voice call related messages, or drafts thereof, stored in a memory unit 108, or by a combination of the two mentioned ways. Voice call related information may however also be obtained in other ways.

It is thus at this stage where the calling party defines what type of information he would like to present to the called party. Information typically comprise descriptors as mentioned above, such as "Name of the calling party", "Subject of voice call", "Priority of voice call" and a "Ring tone", which may be specified or verified by the calling party. This information may also contain links to URL-sites on the web from which further information such as pictures, ring tones etc. may be available. Suggestions or drafts of entries to these descriptors may of course be available in the memory unit 108. The calling party may use the user input unit 102 to insert entries to these descriptors. The calling party may however alternatively insert entries by using other means or functions, such as voice control, voice recognition, by using a touch screen, in which case the portable communication device 100 is equipped with a touch screen, or possibly connected to one.

The caller record also comprises a descriptor identifying the caller. According to this embodiment of the present invention, the description comprises the phone number of the caller, of which the telephone subscriber identity is one example.

According to an alternative embodiment of the present invention the identifying descriptor comprises other information identifying the caller. Examples of such information are a randomly generated number or combination of digits and alphabetical characters, a randomly calculated number, an precise timestamp, etc, to mention a few examples of unique content of the identifying descriptor.

Since the efficiency of the voice call related information to be sent to the called party relies on the reaction by the called party whom is receiving the voice call related information, the entries and descriptors are preferably selected and specified by the calling party with care. However, an erroneous or misleading description as voice call related information may soon have the opposite effect, such that the called person does not prioritize or down-prioritizes voice calls from a certain person, here the calling party.

At the step of obtaining a caller record, step 302, the portable communication device 100 may store the voice call related information the memory unit 108.

Having obtained the voice call related information, this is sent in the step of sending in real time the caller record comprising the caller phone number over a packet switched network to the called party, step 304. This step is performed by the transceiving unit 102 of the portable communication device 100, under the control of the control unit 106.

According to one embodiment of the present, it is the phone number of the caller (=calling party), which is the descriptor identifying the caller.

According to a preferred embodiment of the present invention it is important that the caller record message is sent in real time or in practise, in substantially real time, since sending a message over a packet switched network may take a much too long time until receipt of information by the recipient.

The present invention involves sending voice call related information from a calling party to a called party before setting up the circuit switched voice call. The time required for sending the information to the called party, has to be short in order to provide an acceptable user experience. The time duration between sending the voice call related information until the receipt by the calling party of an acknowledge sent by the called party, may be on the order of 5-10 seconds. It would be not be advantageous to prolongue this time duration, for which reason it is important to send the voice call related information in real time over the packet switched network.

Figure 4:
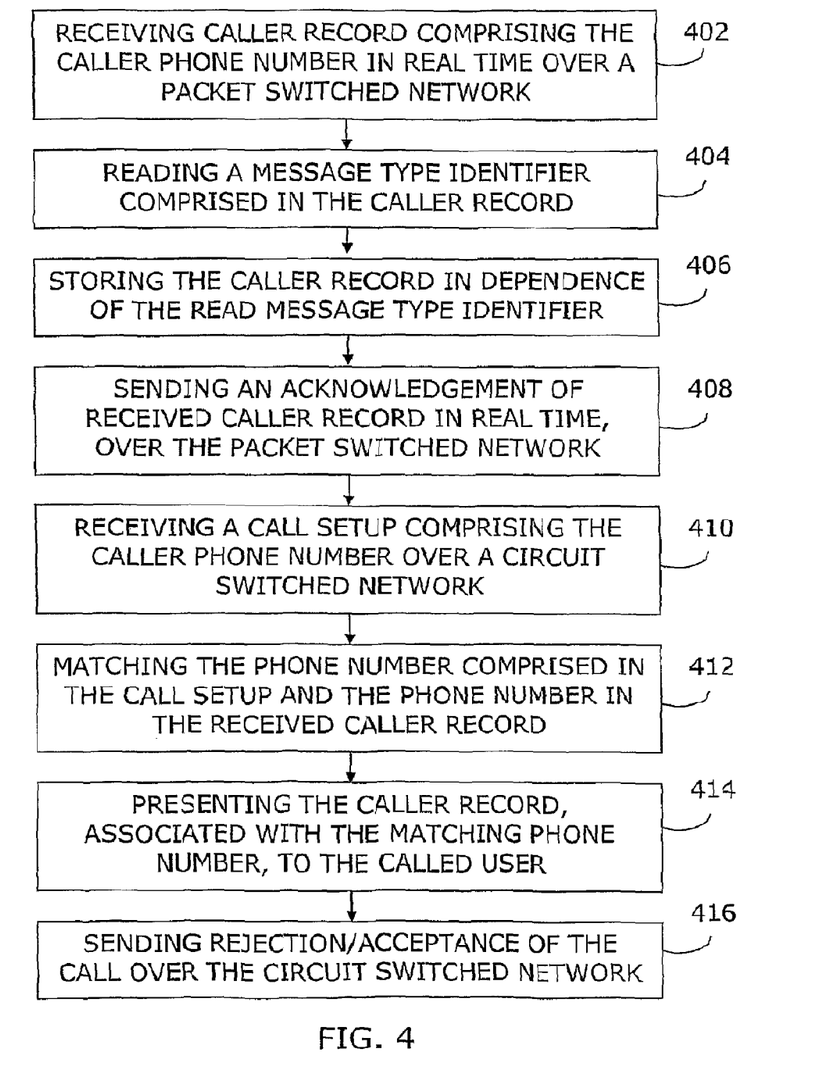

With reference to FIGS. 2 and 4, schematically showing a portable communication device for obtaining voice call related information, according to one embodiment of the present invention, and disclosing a flow-chart of a method for obtaining voice call information, according to one embodiment of the present invention, respectively, the method for obtaining voice call related information is now proceeded.

After step 304 the sent voice call related information is now received by the called party, according to the step 402, of receiving caller record comprising the caller phone number in real time over a packet switched network.

The voice call related information sent by the calling party and received by the called party, is now available by the portable communication device 200 for obtaining voice call related information.

According to one embodiment of the present invention, having received the information, the step of reading a message type identifier comprised in the caller record is now performed, step 404. Within this step the control unit 206 of the portable communication device 200 reads, or according to an alternative embodiment of the present invention, controls the message type identifier of the voice call related information.

The message type identifier for the purpose of identifying the type of message may be of any type, for instance an identifier that indicates a first state when being present, and a second when being absent, or alternatively an identifier that may have two or more states, indicating two or more status states.

According to one embodiment of the present invention the message type identifier being used may be a two-state identifier, which indicates that the received message indeed is voice call related information to be used in the present invention for instance. During this stage, step 404, the control unit 206 thus reads the message type identifier of the information that was received in step 402.

Having performed step 404 by the control unit 206 of the portable communication unit 200, the step 406, storing the caller record in dependence of the read message type identifier, follows. Since the control unit 206 identified that the received message indeed was a caller record, being one type of voice call related information, the caller record is stored in the memory unit 208.

According to one embodiment of the present invention, the caller record comprises the phone number of the calling party, being one example of the descriptor identifying the calling party, as mentioned above. The descriptor identifying the calling party is used to link the stored voice call related information with an in-coming circuit switched voice call setup, as will be described below. The circuit switched voice call setup also comprises the descriptor identifying the calling party, which n this case is the phone number of the calling party. By storing the descriptor identifying the calling party already at the stage at which the voice call related information is received, a subsequent association of the voice call related information with the circuit switched voice call setup, is enabled. This association enables certifying that the correct voice call related information is presented to the called party, before having to decide whether to accept, reject or ignore the in-coming circuit switched voice call.

According to an alternative embodiment the voice call related information comprises links URL-sites on the web or to servers or other data locations. Information such as pictures, video clips and ring tones be gained by fetching information from these locations, in a manner well known to a person skilled in the art.

Having stored the voice call related information in dependence of the read message type identifier in step 406, follows the step of sending an acknowledgement of received caller record in real time over the packet switched network, step 408. This acknowledgement is sent by the transceiving unit 202 under the control of the control unit 206.

This acknowledgement sent in real time by the portable communication device 200 for obtaining voice call related information, is thereafter received by the transceiving unit 102 of the portable communication device 100 for providing voice call related information, in the step of receiving in real time an acknowledgement of received caller record, step 306, as the acknowledgement is sent from the called party device to the calling party device.

The calling party device has now received an acknowledgement of received voice call related information from the called party device, meaning that the sent voice call related information is available by the called party device and ready to be presented to the called party upon request.

Upon receiving the acknowledgement by the transceiving unit 102 the control unit 106 is notified. According to one embodiment of the present invention, it is a prerequisite for the control unit 106 to receive a notification from the transceiving unit 102 that an acknowledgement has been received by the transceiving unit 102 from the called party device, before the method of providing voice call related information to a called part device can continue. Receiving an acknowledgement by the transceiving unit 102 may thus function as a trigger for proceeding the method by the called party device 200.

Having received an acknowledgement in real time by the transceiving unit 102 over the packet switched network, the step of sending a call setup message comprising the phone number of the calling party, which is one example of the descriptor identifying the calling party, over a circuit switched network, is performed. A call setup message is thus send over a network that is different from the network on which the calling party device received the acknowledgement in real time.

One reason for sending the call setup message over a circuit switched network and not over a packet switched network is the problem concerning delays and the variation of delays in the packet switched networks of the present state of art.

Upon sending the voice call setup message comprising the phone number of the caller over the circuit switched network, in step 308, by the transceiving unit 102 under the control of the control unit 106 of the portable communication device 100, the call setup message is received by the transceiving unit 202 of the portable communication device 200 in the step of receiving the call setup comprising the caller phone number over a circuit switched network, step 410. The call setup is typically received by the transceiving unit 202 within about one to two seconds from the time of sending the call setup by the calling party device 100.

The called party device has now received both voice call related information as stored in the memory unit 208 and a call setup, as received in the step 410.

The received call setup message in step 410 may be related to any calling person and may therefore not have anything to do with the received voice call related information, that may have been received earlier, in step 402. In order to determine whether there is any voice call related information stored in the memory unit 208 of the called party device 200, which voice call related information relates to the calling party, the step of 412 is performed, by the associating unit 210 of the called party device 200, that is associating the phone number comprised in the voice call setup message and the phone number in the received caller record, by matching them.

A successful matching of the descriptors identifying the calling party, according to one embodiment of the present invention, means that the phone number of the voice call related information stored in the memory unit 208, is the same phone number of the calling party of the circuit switched voice call setup. This implies that there is voice call related information present in the memory unit 208 that relates to the calling party of the circuit switched voice call setup.

According to an alternative embodiment of the present invention the descriptor identifying the calling party may comprises other information, as mentioned earlier in connection to step 302.

In case a randomly generated number or combination of digits and alphabetical characters, a randomly calculated number, a precise timestamp, etc, was included in the caller record as a descriptor for identifying the calling party, this information content is also comprised in the circuit switched voice call setup, and is therefore comprised in the information being received in setup 410. A successful matching of the descriptor identifying the calling party therefore includes the determination that the randomly generated number or combination of digits and alphabetical characters, the randomly calculated number, the precise timestamp, or the like, comprised in the voice call related information as received in step 402 is the same the randomly generated number or combination of digits and alphabetical characters, the randomly calculated number, the precise timestamp, or the like, comprised in the circuit switched voice call setup, as received in step 410.

Subsequent to the matching, in step 412, the next step of presenting the caller record, that is the voice call related information, associated with the matching phone number to the called party, step 414, is performed.

According to one embodiment of the present invention the descriptor itself identifying the calling party, that was used in the matching step, step 412, is not presented to the called party in step 414.

The user of the called party device thus receives information from the user of the calling party device, which information is intended to help the called party making better decisions on whether to accept an in-coming circuit switched voice call or to reject it.

The descriptors as mentioned above may be presented to the called party at this stage. In connection to presenting information contained in the voice call related information, a ring tone that may be specified by the calling party may now be activated within the called party device to alert the user of the portable communication device for obtaining voice call related information. In this way the called party may receive specific information about the importance of the voice call, the priority of the call and so on. With the help from the presented information the called party may thus easily determine whether it is worthwhile to answer the circuit switched voice call by accepting the call, rejecting it or simply ignoring it.

Having access to the voice call related information as sent by the calling party, the called party reacts to the information as presented in step 414 by the information presenting unit 212 of the called party device 200, after which step 416 is performed, sending rejection/acceptance of the call over the circuit switched network. Based upon user input from the called party by using the user input unit 204, the transceiving unit 202 sends either a rejection or an acceptance as a response to the call setup, over the circuit switched network, under the control of the control unit 206.

Having sent the rejection or the acceptance as an answer to the call setup, the step of 310 follows, receiving rejection or acceptance of the call over the circuit switched network, by the transceiving unit 102 of the portable communication device 100 of the calling party. By receiving an acceptance to the circuit switched call setup, the circuit switched call is established between the calling party and the called party and by receiving a rejection to the call setup, it is clear that the circuit switched voice call setup did not result in a circuit switched voice call between the two parties.

Figure 5:
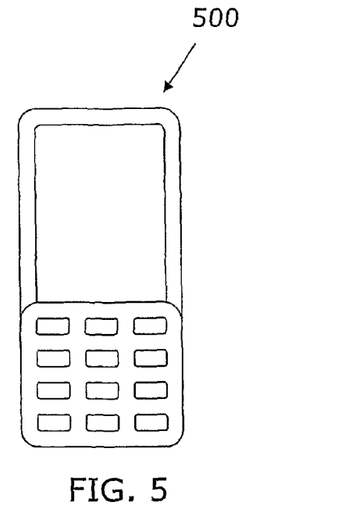

By referring to FIG. 5 schematically showing a portable communication device, according to a preferred embodiment of the present invention, it is indicated that each one of the portable communication device for providing voice call related information 100 and the portable communication device for obtaining voice call related information 200, may be a mobile phone.

It is emphasized that this invention can be varied in many ways, of which the alternative embodiments above only are examples of a few. These different embodiments are hence non-limiting examples. The scope of the present invention, however, is only limited by the subsequently following claims.

According to an alternative embodiment of the present invention, the sending of a circuit switched voice call setup message in step 308 from the calling party device may be performed upon expiration of a time period from the time of sending the caller record, in step 304. According to another embodiment of the present invention, the voice call setup is sent over the circuit switched network independently of the time at which the voice call related information is sent over the packet switched network. According to these two alternative embodiments the voice call related information may be stored in the memory unit 208 in case the voice call related information is received before the circuit switched voice call setup is received by the called party device, as is described above. If however the voice call related information is received after the circuit switched voice call setup is received, that is that the circuit switched voice call setup message is received at first, the circuit switched voice call setup is put on hold during a certain time, during which the voice call related information is awaited. This time duration may be implemented as a timeout, and if the voice call related information is received before expiration of the timeout, the voice call related information may be associated with the circuit switched voice call setup, provided that the descriptors identifying the calling party, comprised in the two pieces of information match, so that the voice call related information may be presented to the called party by the called party device.

Figure 3:
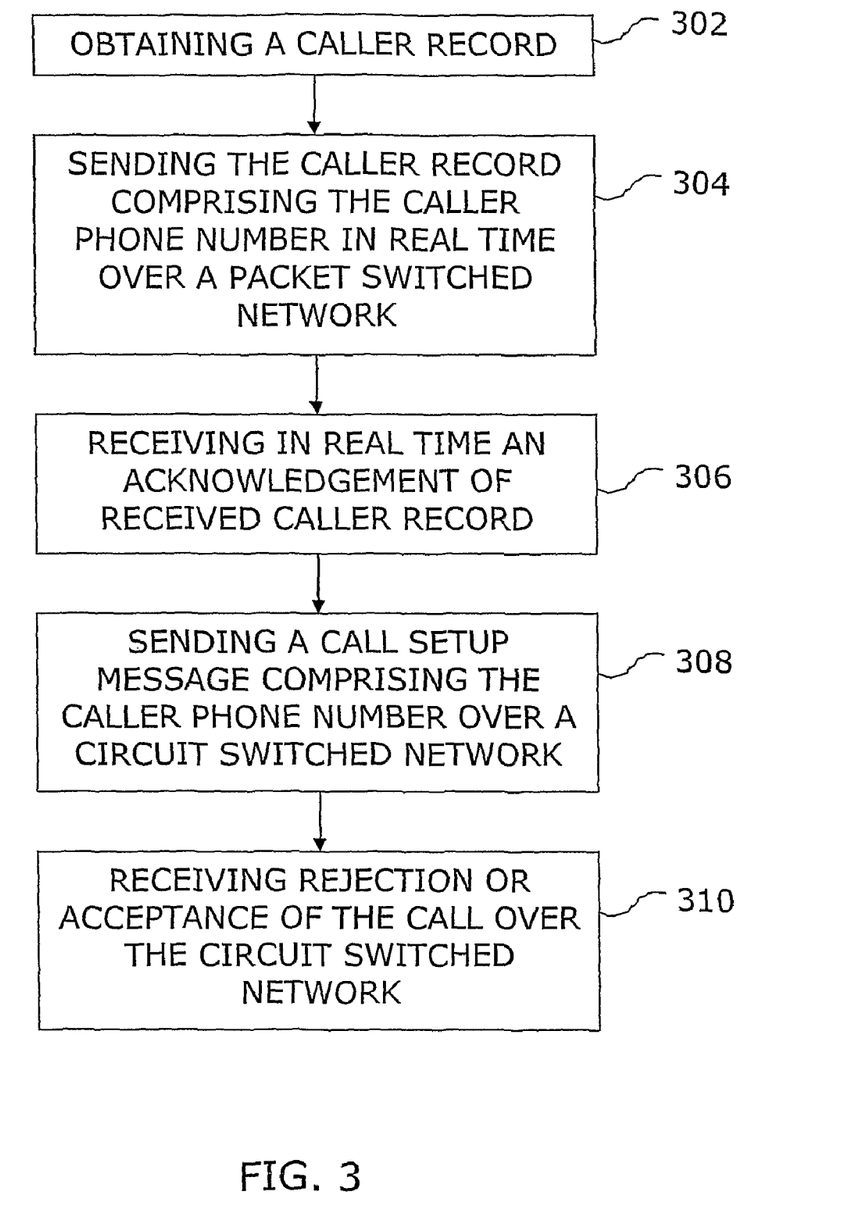
FIG. 3 presents a flow-chart of a method for providing voice call information, according to one embodiment of the present invention, FIG. 4 discloses a flow-chart of a method for obtaining voice call information, according to one embodiment of the present invention, and FIG. 5 schematically shows a portable communication device, according to a preferred embodiment of the present invention.

According to an alternative embodiment the order of the steps within the flow-charts as presented in FIGS. 3 and 4 may be different. Certain steps may be included in others or even be deleted.

Within the portable communication device as schematically shown in FIGS. 1 and 2, the functional units may be connected differently to each other and some units may even be comprised in other units. Moreover some functions that are addressed to certain units may be performed by other units or in combination with more units. Obviously, other units than the ones as presented in said FIGS. 1 and 2, may be included in the portable communication devices.

The described present invention thus carries the following overall advantages:

The present invention provides the possibility to a calling party to take advantage of the capabilities to present information about the calling party and the voice call.

The present invention also provides the advantage of using a circuit switched network for the call setup, thereby avoiding uneven delaying and echoing which would ruin any user experience.

For the calling party the present invention increases the possibility to reach through to the called party by presenting the information that can be of interest to the called party, which information may cause the called party to interrupt the on-going business and take the call.

For the called party the invention as presented herein, provides the advantage of giving a help in sorting out which circuit switched voice calls may be worthwhile to take, decreasing the number of interruptions of any on-going work.

The invention claimed is:

1. A method for providing voice call related information from a first party device to a second party device, prior to establishing a voice call between the first party device and the second party device, comprising:
    sending the voice call related information by the first party device to the second party device over a packet switched network, and
    sending a call setup message, over a circuit switched network, of the voice call by the first party device,
    so that the voice call related information is enabled to be presented to a user of the second party device before responding to the call setup message,
    receiving by the first party device over the packet switched network an acknowledgement from the second party device of receipt of the voice call related information, and
    where sending a call setup message is performed depending on receiving the acknowledgement, and
    where the voice call related information and the call setup message comprise an identifier of the user of the first party device.

2. The method for providing voice call related information according to claim 1, where the voice call related information comprises an information type indicator.

3. The method for providing voice call related information according to claim 1, where the voice call related information further comprises data related to the user of the first party device.

4. A method for obtaining voice call related information by a second party device from a first party device, comprising:
    receiving the voice call related information by the second party device over a packet switched network,
    receiving the call setup message by the second party device from the first party device over a circuit switched network, and
    responding by the second party device to the first party device over the circuit switched network to the call setup message, based on the voice call related information received over the packet switched network;
    sending an acknowledgement by the second party device of receipt of the voice call related information, to the first party device over the packet switched network,
    where the voice call related information and the call setup message comprise an identifier of the user of the first party device.

5. The method for obtaining voice call related information according to claim 4, where the voice call related information comprises an information type indicator, which information type indicator indicates that the voice call related information is to be used to present information upon receiving the call setup by the second party device.

6. The method for obtaining voice call related information according to claim 4, where the voice call related information further comprises data related to the user of the first party device.

7. The method for obtaining voice call related information according to claim 4, further comprising:
    associating the received call setup with the received voice call related information, by matching the first party device user identifier comprised in the voice call related information and the first party device user identifier comprised in the call setup, so that the voice call related information is enabled to be presented to the user of the second party device before responding to the call setup message.

8. The method for obtaining voice call related information according to claim 7, where associating further comprises:
    presenting the voice call related information by the second party device.

9. The portable communication device according to claim 8, in which the portable communication device is a mobile phone.

10. A portable communication device for providing voice call related information over a packet switched network to a communication device for receiving voice call related information, comprising:
    a transceiving unit, arranged to send the voice call related information over a packet switched network to the communication device and to send a call setup message over a circuit switched network to the communication device,
    a user input unit, arranged to receive user input from a user of the portable communication device,
    a control unit, connected to the user input unit and the transceiving unit, arranged to control sending the voice call related information over the packet switched network and to control sending the call setup message over the circuit switched network, so that voice call related information is enabled to be presented to a user of the communication device for receiving the voice call related information,
    the transceiving unit further being arranged to receive an acknowledgement of receipt of received voice call related information over a packet switched network, and in which the control unit further is arranged to detect receiving the acknowledgement over the packet switched network the control unit further being arranged to send the call setup message depending on receiving the acknowledgement, and where the voice call related information and the voice call setup message comprise an identifier of the user of the first party device.

11. The method for providing voice call related information according to claim 10, where the voice call related information comprises an information type indicator.

12. A portable communication device for obtaining voice call related information over a packet switched network from a communication device for providing voice call related information, comprising:

a transceiving unit, arranged to receive the voice call related information over the packet switched network from the communication device, to receive a call setup message from the communication device over a circuit switched network, and to respond to the communication device over the circuit switched network to the call setup message, a user input unit, arranged to receive user input from a user of the portable communication device, a control unit, connected to the user input unit and the transceiving unit, arranged to control receiving the voice call related information from the communication device over the packet switched network, to control receiving the call setup message from the communication device over the circuit switched network, and to control responding to the call setup message to the communication device over the circuit switched network, so that voice call related information is enabled to be presented to the user of the portable communication device, and in which the transceiving unit further is arranged to send an acknowledgement of receipt of the voice call related information to the communication device over the packet switched network, and in which the control unit further is arranged to control sending the acknowledgement of receipt of the voice call related information to the communication device over the packet switched network, the voice call related information and the call setup message comprise an identifier of the user of the first party device.

13. The portable communication device according to claim 12, further comprising:

a memory unit, connected to the control unit, and arranged to provide storage of and access to voice call related information, and where the control unit further is arranged to read an information type indicator comprised in the voice call related information and arranged to store the voice call related information in the memory unit, based on the information type indicator.

14. The portable communication device according to claim 12, further comprising:

an associating unit, connected to the control unit and the memory unit, arranged to associate the received call setup with the received voice call related information, by matching an identifier of the user of the communication device in the voice call related information and an identifier of the user of the communication device in the call setup, so that the voice call related information is enabled to be presented to the user of the portable communication device before responding to the call setup message.

15. A system comprising:

a first party device comprising:

a first transceiver to send voice call information over a packet switched network to a second party device, to send a call setup message over a circuit switched message to the second party device, to receive over the packet switched network an acknowledgement of receipt of the voice call information from the second party device, and to receive over the circuit switched network a response to the call setup message from the second party device;

where the voice call information includes a first identifier and the call setup message include a second identifier; and the second party device comprising:

a second transceiver to receive the voice call information over the packet switched network from the first party device, to receive the call setup message over the circuit switched network from the first party device, to send over the packet switched network the acknowledgement of receipt of the voice call information to the first party device, to respond over the circuit switched network to the call setup message to the first party device;

a processor to associate the voice call information and the call setup message based on the first identifier and the second identifier.

16. The system of claim 15, where the voice call information includes caller information and the processor is further configured to present the caller information to a user of the second party device.

17. The system of claim 15, where the first transceiver receives the acknowledgement of receipt of the voice call information before sending the call setup message.

18. The system of claim 15, where the first transceiver sends the call setup message at a time independent of the transceiver sending the voice call information.

19. The system of claim 15, where the first transceiver sends the call setup message before a period of time after sending the voice call information.

* * * * *